United States Patent
Zhelyaskov et al.

(10) Patent No.: US 10,819,251 B2
(45) Date of Patent: Oct. 27, 2020

(54) LINEAR PIEZOELECTRIC ACTUATOR ON RAIL SYSTEM

(71) Applicant: DTI Motion Corp., Sarasota, FL (US)

(72) Inventors: Valentin Zhelyaskov, Sarasota, FL (US); Serhiy Petrenko, Kiev (UA); Mark Broderick, Sarasota, FL (US)

(73) Assignee: DTI Motion Corp., Sarasota, FL (US)

( * ) Notice: Subject to any disclaimer, the term of this patent is extended or adjusted under 35 U.S.C. 154(b) by 503 days.

(21) Appl. No.: 15/910,764

(22) Filed: Mar. 2, 2018

(65) Prior Publication Data

US 2018/0254717 A1 Sep. 6, 2018

Related U.S. Application Data

(60) Provisional application No. 62/466,083, filed on Mar. 2, 2017.

(51) Int. Cl.
| | |
|---|---|
| *H02N 2/02* | (2006.01) |
| *H02N 2/06* | (2006.01) |
| *H02N 2/00* | (2006.01) |
| *E06B 9/38* | (2006.01) |
| *B25J 9/12* | (2006.01) |
| *E06B 9/24* | (2006.01) |

(52) U.S. Cl.
CPC .............. *H02N 2/026* (2013.01); *B25J 9/123* (2013.01); *E06B 9/24* (2013.01); *E06B 9/38* (2013.01); *H02N 2/006* (2013.01); *H02N 2/0025* (2013.01); *H02N 2/0085* (2013.01); *H02N 2/062* (2013.01); *H02N 2/067* (2013.01); *Y10S 901/02* (2013.01); *Y10S 901/23* (2013.01)

(58) Field of Classification Search
CPC ...... H02N 2/026; H02N 2/062; H02N 2/0025; H02N 2/006; H02N 2/067; B25J 9/123
See application file for complete search history.

(56) References Cited

U.S. PATENT DOCUMENTS

| 4,059,081 A | 11/1977 | Kayanuma |
|---|---|---|
| 4,127,097 A | 11/1978 | Takimoto |

(Continued)

FOREIGN PATENT DOCUMENTS

| EP | 1333150 A2 | 8/2003 |
|---|---|---|
| EP | 1333706 A1 | 8/2003 |
| FR | 2765046 A1 | 12/1998 |

*Primary Examiner* — Bryan P Gordon
(74) *Attorney, Agent, or Firm* — Young Basile Hanlon & MacFarlane, P.C.

(57) ABSTRACT

A linear actuator has a base, a linear guide coupled to a flat, planar side of the base and extending in a travel length of an object to be moved, a contact plate extending along the flat, planar side of the base, and a carriage. The carriage includes an enclosure formed of an acoustically isolating material, a moving element configured to move along the guide and is coupled to the enclosure, a piezoelectric element including a contact site in physical contact with the contact plate, and a housing elastically holding the piezoelectric element, the housing coupled to the enclosure with no direct contact with the moving element. An electrical power source is in electrical communication with the piezoelectric element, wherein the power source energizes the piezoelectric element to effectuate movement of the carriage along the linear guide via the physical contact between the contact site and the contact plate.

20 Claims, 7 Drawing Sheets

(56) References Cited

U.S. PATENT DOCUMENTS

| | | | |
|---|---|---|---|
| 4,153,025 A | 5/1979 | Thornburgh | |
| 4,308,841 A | 1/1982 | Kingsley | |
| 4,902,953 A | 2/1990 | Kraft et al. | |
| 4,944,276 A | 7/1990 | House et al. | |
| 6,288,473 B1 | 9/2001 | Mittas | |
| 6,979,962 B2 * | 12/2005 | Cavarec | E06B 9/32 318/9 |
| 7,002,310 B2 | 2/2006 | Cavarec et al. | |
| 7,389,806 B2 | 6/2008 | Kates | |
| 7,750,534 B2 * | 7/2010 | Noda | G03B 5/00 310/316.01 |
| 2007/0096598 A1 * | 5/2007 | Ichikawa | H02N 2/026 310/323.02 |
| 2010/0071856 A1 | 3/2010 | Zaharchuk et al. | |
| 2011/0278987 A1 * | 11/2011 | Oda | H02N 2/04 310/323.16 |
| 2015/0200612 A1 * | 7/2015 | Matsukawa | G02B 7/10 310/323.01 |

\* cited by examiner

LINEAR PIEZOELECTRIC ACTUATOR ON RAIL SYSTEM

CROSS-REFERENCE TO RELATED APPLICATION(S)

This application claims priority to and the benefit of U.S. Provisional Application Ser. No. 62/466,083, filed Mar. 2, 2017, the entire disclosure of which is hereby incorporated by reference.

TECHNICAL FIELD

This disclosure relates to linear piezoelectric actuators and devices linearly moved by such linear piezoelectric actuators.

BACKGROUND

Many devices, including motorized window covering systems, include an electromagnetic rotary motor, typically a DC motor with a reducer, and an object such as a window covering mechanism, that can be moved linearly back and forth, such as between an open and closed configuration. These types of systems tend to be complicated and their major disadvantages include heavy weight (including the weight of the reducer and coupling mechanism); power consumption when the system is in fixed positions (e.g., the need for the motor drive to consume power to maintain a brake position); the need for a gear-train for the rotary to linear motion converting mechanism; poor position resolution; excessive noise during operation; and high cost.

SUMMARY

Disclosed herein are aspects and implementations of linear actuator apparatuses and systems for using the linear actuator, such as a motorized blind. One embodiment of a linear actuator apparatus as disclosed herein has a base, a linear guide coupled to a flat, planar side of the base and extending in a travel length of an object to be moved, a contact plate extending along the flat, planar side of the base, and a carriage. The carriage includes an enclosure formed of an acoustically isolating material, a moving element configured and dimensioned to mechanically couple with the linear guide and to move along the guide and is coupled to the enclosure, a piezoelectric element, the piezoelectric element including a contact site in physical contact with the contact plate and a housing elastically holding the piezoelectric element, wherein the housing is coupled to the enclosure and has no direct contact with the moving element. An electrical power source is in electrical communication with the piezoelectric element, wherein the electrical power source energizes the piezoelectric element to effectuate movement of the carriage along the linear guide via the physical contact between the contact site and the contact plate.

The linear actuator apparatus can further comprise a control system that outputs an electric signal that oscillates at an excitation frequency. The control system comprises the electric power source, a frequency signal generator that oscillates the electric signal at the excitation frequency, and a current stabilization module. The current stabilization module is configured to measure a consumed current flowing through the linear actuator apparatus, compare the consumed current with a preprogrammed current, and adjust the excitation frequency until the consumed current becomes equal to the preprogrammed current.

BRIEF DESCRIPTION OF THE DRAWINGS

The disclosed technology can be better understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

The performance of many devices that rely on linear motion (e.g., a motorized blind to cover and uncover a window or a 3D printer) that uses an electromagnetic rotary motor can be significantly improved by using a linear actuator apparatus that is driven by a rotary piezoelectric drive motor. Use of an electromagnetic motor in linear actuators require a separate electromagnetic motor to serve as a brake as the electromagnetic motor does not have any holding torque when de-energized. The piezoelectric motor eliminates the use of second motor as it provides full holding torque/force when de-energized.

The use of a piezoelectric rotary motor in linear actuator eliminates use of a reducer, due to the high torque of the piezoelectric motor. However, the kinematic mechanism for moving an object in a linear manner, which converts rotary into linear movement, can be complicated, including either cords and converting blocks or racks. Such complicated elements can decrease the reliability of, and increase the size, weight, and cost of a device or system. Furthermore, these complicated elements limit the range of movement of the system. Moreover, the use of an additional kinematic mechanism can decrease the precision of positioning systems based on this principle.

The disclosed technology addresses the above-mentioned problems of using an electromagnetic motor or rotary piezoelectric motor or a conventional piezoelectric motor for linear movement by using a novel piezoelectric linear actuator to move (e.g., drive or direct) an object (e.g., a blind, 3D printer head or any other suitable object). The disclosed technology can simplify the motorized mechanism for effectuating linear motion of an object through elimination of the kinematic connection between the motor and the object. Accordingly, reliability of operation of the linear actuator is increased, while the size, weight, and price, of the linear actuator are decreased. Furthermore, the range of movement of the linear actuator may be increased. Moreover, the positioning resolution of the linear actuator is improved, thereby resulting in a widening of the application range.

Further, the disclosed technology includes the benefits and advantages that are achievable by direct coupling of the linear piezoelectric actuator to an object, thereby not requiring any additional mechanism between the linear piezoelectric actuator and the object (e.g., a blind or shade).

The type of linear actuator in the disclosed technology can include a piezoelectric element mounted to a holder (e.g., a piezoelectric element holder) that is indirectly coupled to a moving element that can move along a guide (e.g., a long guide which can include one or more rails). In an implementation, the holder can be an acoustically isolated holder, into which the piezoelectric element is placed, and which can isolate the piezoelectric element from vibrations from the moving element moving along the guide. The moving element can be directly attached to an object to be moved, thereby reducing the use of a long kinematic connection. In a system like this, monitoring of the position of the moving element can be done using a position sensor (encoder).

The elements, components, and features in the disclosed technology can be used independently or in combination with any of the other elements, components, and features described in the present disclosure. Further, the operations or steps performed by the disclosed technology can be performed in any order or concurrently.

Figure 1A:
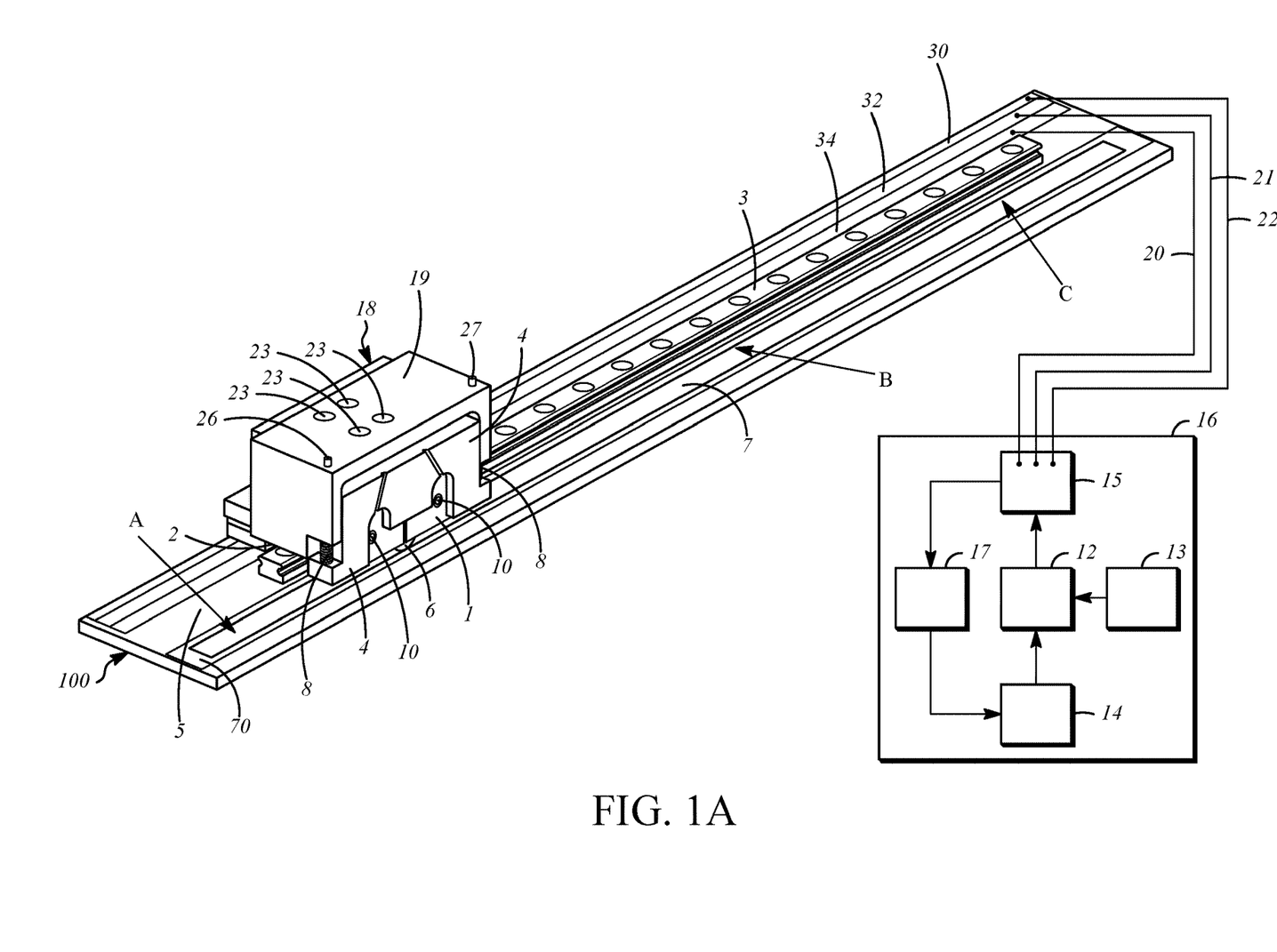
FIG. 1A is a diagram illustrating an example of a linear actuator apparatus that incorporates a piezoelectric element in accordance with some implementations of the present disclosure.

FIG. 1A is a diagram illustrating an example of a linear actuator apparatus 100 (also referred to as "linear actuator"). In the illustrated example, the linear actuator 100 is a long travel distance linear actuator (also referred to as a "long travel distance motor"). A linear actuator 100 may be included in any suitable device or mechanical system that requires linear motion. Examples of devices that may include a linear actuator in accordance with the present disclosure include, but are not limited to, a motorized blind system, a 3D printer, a disk drive, various robotic devices, and an adjustable seat of a vehicle. "Long travel distance" means linear distances up to at least six feet.

The linear actuator 100 may include a piezoelectric element 1, a moving element 2, a guide 3 ("linear guide" or "rail"), a holder 4, a base 5, a contact site 6, a contact plate 7, springs 8, electrodes 10, a common electrode 11, a pulse amplifier 12, an external power supply 13, a high frequency signal generator 14, a push-button control 15, a control system 16, a current stabilization module 17, an enclosure 19, a first lead 20, a second lead 21, and a third lead 22.

The linear actuator 100 can be positioned or orientated parallel to the direction of movement of an object to be moved. The linear actuator 100 may be configured such that an object is connected to a carriage 18. The carriage 18 includes the piezoelectric element 1, the moving element 2, the holder 4 and the enclosure 19. As will be discussed in greater detail below, the carriage 18, by way of excitation of the piezoelectric element 1, moves longitudinally along the linear guide 3, while the base 5 supporting the guide 3 and contact plate 7 remains stationary.

The piezoelectric element 1 can be a variety of shapes, such as a rectangular flat resonator, in which two orthogonal longitudinal standing waves are excited. The piezoelectric element 1 can be any piezo material known to those skilled in the art. The piezoelectric element 1 can include the contact site 6. In an implementation, the piezoelectric element 1 can be in the shape of a rectangular plane resonator and the contact site 6 can be located central on a surface of the piezoelectric element 1.

Figure 6:
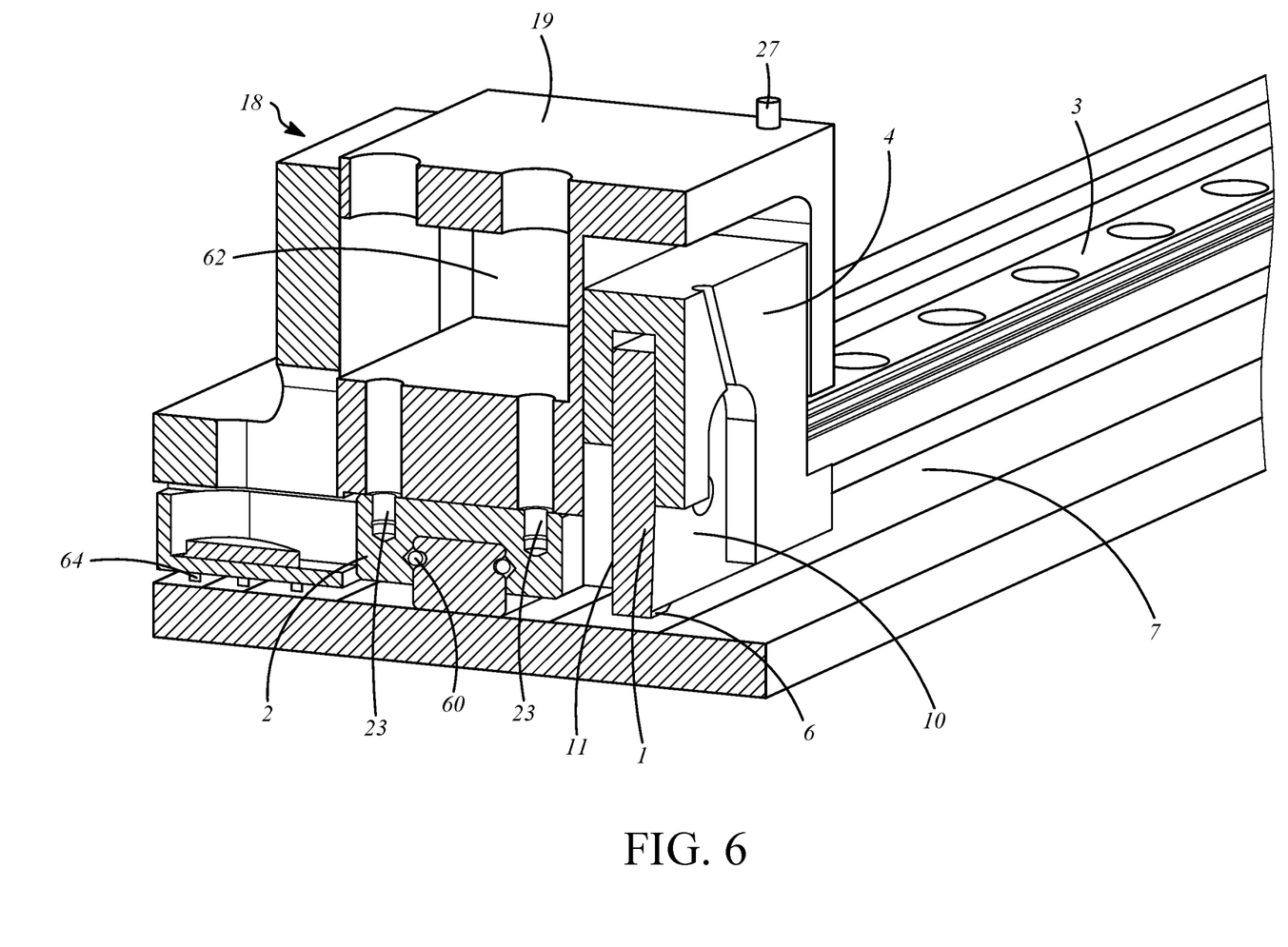
FIG. 6 is a cross-sectional view of the carriage of the linear actuator disclosed herein, the cross section taken along a pair of apertures for screws 23, as shown in FIG. 1A.

In some implementations, the moving element 2 is coupled to the carriage 18 via the enclosure 19, whereby the moving element 2 effectuates movement of carriage 18 along the linear guide 3 as the piezoelectric element 1 oscillates. The moving element 2 is moved by excitation of the piezoelectric element 1 so must be indirectly coupled to the piezoelectric element 1. The coupling must be indirect to reduce the interference of acoustic vibrations caused by the moving element 2 along the guide 3, which can interfere with the piezoelectric element 1 and the contact between the contact site 6 and the contact plate 7. The moving element 2 can be, for example, a linear slider shaped to fit over the guide 3 with bearings 60 to slide along the guide 3. This is illustrated in FIG. 6.

The base 5 has a flat, planar surface to which the guide 3 and the contact plate 7 can be attached such that each is respectively coaligned. The base 5 is at least as long as the travel movement required for the object to be linearly moved. The linear guide 3 is mounted, attached, or otherwise coupled to the base 5 such that there is in complete contact of an underside of the guide 3 to the base 5 to ensure collinearity of their geometrical axes. The contact plate 7 is also mounted, attached or otherwise coupled to the base 5 such that it extends parallel to the guide 3. The contact plate 7 can be attached with an adhesive 70 such as double-sided tape or glue. The contact plate 7 is a thin, solid, elastic plate. In the long travel distance linear actuator, the flatness and parallel alignment of contact plate 7 with respect to the moving element 2 is important along the entire travel distance of the linear actuator 100. To achieve these tight tolerances, a reference flat plane is selected according to which the flat surfaces of all other components are aligned. In the disclosed linear actuator, the base 5 of the actuator is selected as the reference flat surface. Guide 3, which is mounted on the base 5, and the moving element 2, which moves along the guide 3, are in parallel alignment with the base 5 surface. The contact plate 7, because it is thin and elastic and mounted on the flat surface of the base 5, is aligned parallel to the flat surface of the base 5 as well.

In some implementations, the piezoelectric element 1 is housed in the holder 4 (e.g., a piezoelectric element holder). The holder 4 is an elastic material that elastically but tightly holds the piezoelectric element 1. The piezoelectric element 1 and holder 4 are acoustically isolated from the moving element 2. This is achieved by making the enclosure 19 of acoustically insolating materials, such as acoustically isolating plastic. If they are not sufficiently acoustically isolated, when the carriage 18 moves along the long guide 3, acoustic vibrations from the piezoelectric element 1 may leak into the moving element 2 and guide 3 and cause resonance excitation of parasitic mechanical vibrations in the moving element 2, such as the bearings or other parts, which could be fed back into the piezoelectric element 1. The latter could lead to acoustic mechanical micro-vibrations of the piezoelectric element 1, which decreases substantially the efficiency of the actuator 100. In acoustically insolating the holder 4 and the piezoelectric element 1 from the rest of the carriage 18 (e.g., from the moving element 2), acoustic vibrations from the moving element 2 may be prevented from leaking to the piezoelectric element 1 or other elements of the linear actuator 100, which may cause resonance excitation of parasitic mechanical vibrations in the piezoelectric element 1 or other parts of the linear actuator 100. In the case that there is "leaking," to other components of the linear actuator 100, the leaked vibrations could feed back to the piezoelectric element 1. This scenario could cause acoustic mechanical micro-vibrations in the piezoelectric element 1, which may decrease the efficiency of the linear actuator 100.

In order to acoustically isolate the holder 4 and the piezoelectric element 1 from the rest of the carriage 18, the carriage 18 is configured to minimize contact points between the moving element 2 and the enclosure 19, as well as the enclosure 19 and the holder 4. The holder 4 is positioned such that it does not contact the moving element 2. To minimally couple the holder 4 to the enclosure 19, in some of these implementations, one or more attachment pins 26, 27 may be inserted vertically through respective receiving apertures in the enclosure 19, through central axes of the respective springs 8, and into respective et 4' of the holder 4. The enclosure 19 has a void space 62 (see FIG. 6) inside of the U-shaped enclosure 19 in addition to the holder 4. The enclosure 19 is coupled to the moving element 2 with minimal contact points. For example, the enclosure 19 may be minimally coupled to the moving element 2 using screws 23 that extend through the void space 62 to the moving element 2. Furthermore, in some implementations, the enclosure 19 and the moving element 2 may be integrally connected to each other at minimum points of connection to effect minimum coupling. As used herein, "minimum couple" or "minimum coupling" means using the least amount of contact points and the smallest contact area between two structures that will effectuate coupling of two structures.

As noted, the piezoelectric element 1 includes a contact site 6 positioned or located on a central point of the side of the piezoelectric element 1 facing the contact plate 7. The contact site 6 is in physical contact with the contact plate 7 (e.g., a metal contact plate), thus providing a frictional contact between the carriage 18 and the contact plate 7. In some implementations, the frictional contact between the contact plate 7 and the contact site 6 of the piezoelectric element 1 should be of sufficient force to hold the carriage 18 in a stopped or stationary position, when the linear actuator 100 is in a resting state, eliminating the need for a braking mechanism, which continuously draws a current. The frictional contact is strong enough to maintain the object in a stationary position even when positioned in a vertical manner. The springs 8 effect this frictional force. The springs 8 are positioned between the enclosure 19 and the feet 4' of the holder 4 such that the piezoelectric element 1, and thus the contact site 6 of the piezoelectric element 1, is spring loaded, forcing the contact site 6 against the contact plate 7.

The piezoelectric element 1 includes three electrodes, including the electrodes 10 that are located or positioned on one side of the piezoelectric element 1, and a common electrode 11 that is located or positioned on the other side (see FIG. 6) of the piezoelectric element 1. One of the electrodes 10 receives a first current from the electrical power source 13 to effectuate movement in a first direction along the linear guide, and the other of the electrodes 10 receives a second current to effectuate movement in a second direction along the linear guide that is opposite to the first direction. The common electrode 11 can be positioned on an opposite side of the piezoelectric element 1 from electrodes 10, in which the piezoelectric element 1 is polarized perpendicular to flat resonator surfaces of the piezoelectric element 1. The electrodes 10 can be two non-contacting sections of silver on opposing ends of a common surface of the piezoelectric element 1, which the common electrode 11 can be a single section of silver on an opposing surface from the electrodes 10. The piezoelectric element 1 can be polarized perpendicular to the flat surfaces of the electrodes 10, 11. The piezoelectric element 1 can generate a second order vibrational mode along a length L of the piezoelectric element and a first order vibrational mode across a width W of the piezoelectric element. The piezoelectric element 1 can have a natural second order vibrational mode along the length with frequency $\upsilon 2$ and a natural first order vibrational mode across the width with frequency $\upsilon 1$. In some implementations, the $\upsilon 1$ frequency and the $\upsilon 2$ frequency are different and the difference between the $\upsilon 1$ frequency and the $\upsilon 2$ frequency is less than 20%. In some implementations, $\upsilon 1 < \upsilon 2$ in order to obtain a smoother resonance curve and more efficient performance of the resonance curve (assuming that the excitation frequency resides on the right side of the resonance curve).

The electrodes 10, 10, 11 may be in electric communication with the control system 16. In some of these implementations, the electrodes 10, 10, 11 are attached or coupled (either directly or indirectly) to one or more leads (e.g., electrical connections), which can include the leads 20, 21 and 22. The leads 20, 21 and 22 may be coupled, attached, or otherwise connected to the control system 16 The leads 20, 21, 22 can be directly coupled to electrodes 10, and common electrode 11 respectively, using a cable harness that is sufficient in length to move with the carriage 18 the length of the guide 3. In other implementations, the linear actuator can include conducting rails 30, 32, 34 of conductive material. Rail 30 is electrically connected to a common electrode, rails 32, 34 are respectively connected to the electrodes 10 for movement along the guide 3 in a first direction and a second, opposite direction. Brushes 64, schematically illustrated in FIG. 6, may extend from the enclosure 19 to electrically connect the electrodes 10, 11 to the conductive rails 30, 32, 34. For example, a respective brush 64 for a respective conducting rail 30, 32, 34 may have continuous electrical contact with the respective conductive rail 30, 32, 34, during actuator movement. Other electrical connecting means known to those skilled in the art are contemplated.

In some implementations, the control system 16 can include a pulse amplifier 12, an external power supply 13, and a high frequency signal generator 14. The pulse amplifier 12 is connected to the power supply and amplifies the electric signal output by the power supply 13 to the leads. The high frequency signal generator 14 produces the excitation resonant frequency for the piezoelectric element 1. In some implementations, the control system 16 may further include a push-button control 15 that effectuates of direction of movement of the carriage 18, including movement of the carriage 18 along a path corresponding to the guide 3. In these implementations, a human operator may push or otherwise engage the push-button control 15 to effectuate movement of the carriage 18 by activating the power supply 13, the pulse amplifier 12, and the high frequency signal generator 14. While a push-button control 15 is shown, any other suitable means of activating the power supply 13, the pulse amplifier 12, and the high frequency signal generator 14 may be implemented in or with the control system 16. For example, in the case of a 3D printer, a processor of the 3D printer may communicate with the control system 16 to activate the power supply 13, the pulse amplifier 12, and the high frequency signal generator 14.

Figure 1B:
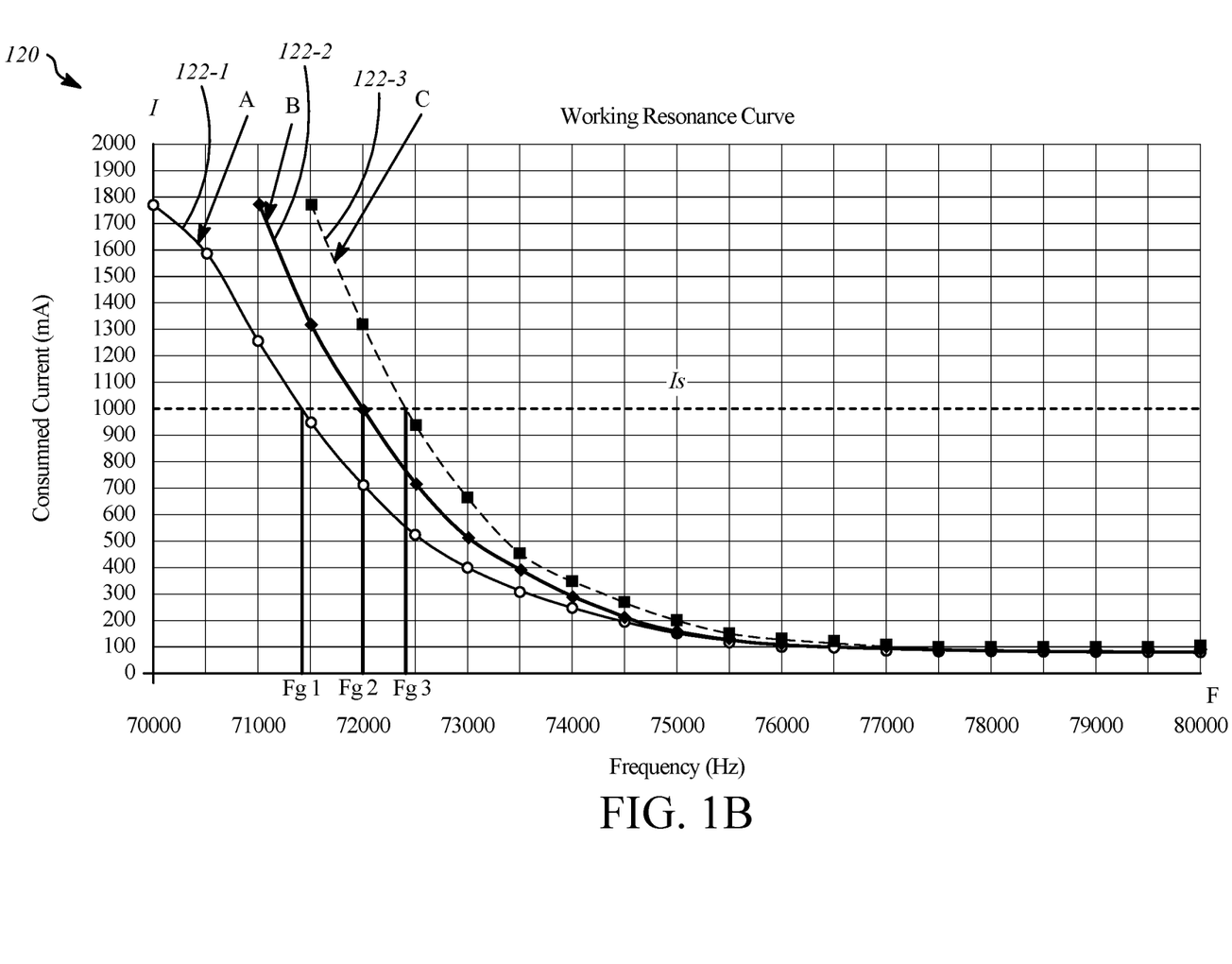
FIG. 1B is a graph of a illustrative working resonance curve produced by the linear actuator apparatus of FIG. 1A.

In some implementations, the control system 16 further includes a current stabilization module 17. As the carriage 18 moves along the guide 3, the state of the resonance curve of the piezoelectric element 1 may vary due to the difficulty of holding mechanical tolerances. FIG. 1B further depicts an example working resonance curve 120 that displays a resonance curve 122 in three different states, 122-1, 122-2, 122-3. The working resonance curve 120 plots a consumed current (e.g., the current flowing through the leads 20, 21, 22, electrodes 10, the common electrode 11, and piezoelectric element 1), as a function of the set frequency of the signal output by the control system 16 (or the "frequency of excitation"). The shape of the resonance curve 122 will change depending on the conditions of the linear actuator 100, the environment, including temperature and humidity, surrounding the linear actuator 100, the location of the carriage 18 with respect to the linear guide 3, or any other relevant conditions. As shown in the working resonance curve, as the carriage 18 moves along the linear guide 3, the shape of the resonance curve 122 can change. In this particular example, the carriage 18 moves towards the distal end of the linear guide 3, the consumed current increases as the frequency of the signal is kept constant. The linear actuator 100 disclosed herein is operated on the right side of a resonance curve, which as known to those skilled in the art, is bell shaped. As illustrated, the depicted working resonance curve 120 is the right side of the resonance curve. The frequencies of excitation for the linear actuators 100 disclosed herein are between about 70 KHz and 80 KHz, inclusive, as shown on the x-axis range from 70000 Hz to 80000 Hz. When carriage 18 moves along the guide 3, the intimate mechanical contact between the contact site 6 and the flat contact plate 7 may change. This may occur due to difficulty of holding mechanical tolerances of less than 1 um in order to provide consistent surface contact along the entire guide 3 and plate 7. As a result, the resonance frequency curve may shift to left or right. The right side of the resonance frequency curve is flatter. That is why, when working at a frequency on the right side, the resonance frequency curve is subject to smaller changes during the movement of the carriage 18 and the control of the actuator 100 is more consistent When the carriage 18 moves along the guide 3, due to difficulty of holding mechanical tolerances as explained above, modulation/change of the resonance frequency curve occurs. As a result, if the piezoelectric element 1 is excited at a fixed frequency on the right side of the resonance curve, substantial instability of the current may arise. This may lead to substantial fluctuations in the speed of movement, to the extent that the carriage 18 may stop in undesired positions along the guide 3. As the state of the resonance curve 122 changes, the consumed current may fluctuate because the frequency of the signal is kept constant by the control system 16. The current stabilization module 17 is configured to correct the frequency of the signal in order to stabilize the consumed current to a programmed current (i.e., the current that the system is set to). In these implementations, the current stabilization module 17 may be configured to measure the consumed current that is flowing through the linear actuator 100 by way of the leads 20, 21, 22, electrodes 10, the common electrode 11, and piezoelectric element 1. The current stabilization module 17 compares the measured consumed current with the programmed current. Knowing the frequency of the signal being output by the control system 16 and the measured current, the current stabilization module 17 can determine whether to increase, decrease, or keep stable the frequency of the signal, such that the measured current stabilizes to a value that is substantially equal to the programmed current (e.g., within 50 milliamps). For example, in reference to the depicted working resonance curve 120, if the frequency of the signal is set at $F_{g1}$, and the measured consumed current increases past the programmed current (e.g., 1000 mA) to a greater consumed current (e.g., 1300 mA), the current stabilization module 17 may determine that the consumed current corresponds to that of resonance curve 122-2, as the excitation frequency is set at $F_{g1}$. In response to this determination, the current stabilization module 17 determines a point along the second resonance curve 122-2 that corresponds to the programmed current. In doing so, the current stabilization module 17 determines that the frequency should be set to $F_{g2}$ (e.g., ~72000 Hz) in order to stabilize the consumed current back to the programmed current (e.g., 1000 mA). The working resonance curve 120 for a particular linear actuator 100 may be determined empirically.

Figure 2:
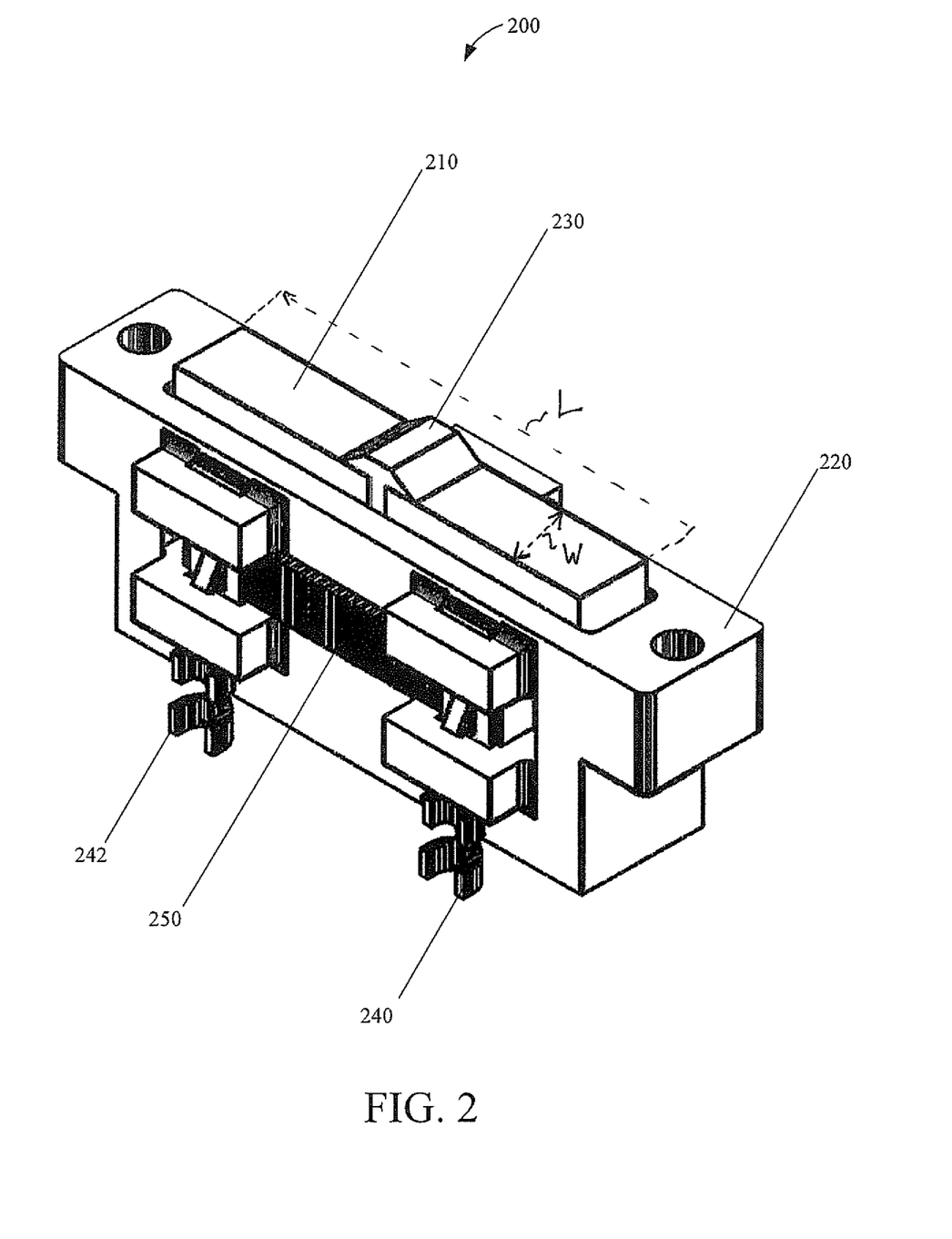
FIG. 2 is diagram illustrating an example of a piezoelectric element mounted in a holder in accordance with some implementations of the present disclosure.

FIG. 2 is a diagram illustrating an example of a holder 200 of a linear actuator (e.g., a piezoelectric actuator or a piezoelectric resonator) according to some implementations, of the present disclosure. The holder 200 depicted in FIG. 2 is configured as a solderless connection system. The holder 200 is configured such that it houses a conductive material (e.g., a material that allows the flow of electrical current, including metallic and non-metallic conductive materials) without soldering one or more wires to the electrodes of the piezoelectric element 210. The solderless holder 200 includes a piezoelectric element 210; a mount 220; a contact site 230; a first crimp contact 240; a second crimp contact 242; and a conductive material 250.

The piezoelectric element 210 (e.g., the piezoelectric element 1 illustrated in FIG. 1A), can be elastically held or secured in the mount 220. The mount 220 can include one or more slots or apertures (which can be of any shape including circular, oval, or polygonal) that allow for the conductive material 250 (e.g., a flexible conductive material) to be held in contact against the piezoelectric element 210. For example, the piezoelectric element 210 can be held flush against the conductive material 250.

Further, the mount 220 can hold, be attached to, or connected to, one or more of the first crimp contact 240 and the second crimp contact 242. The mount 220 can be configured so that the conductive material 250 is compressed between the crimp contacts 240, 242 and the piezoelectric element 210. Accordingly, compression of the piezoelectric element 210 and the conductive material 250 can ensure that electrical contact between the piezoelectric element 210 and the conductive material 250 is maintained. Brushes 64, as described above, can be used to connect conductive rails 30, 32, 34 to the conductive material 250, and in turn, the electrodes 10 and common electrode 11.

Figure 3:
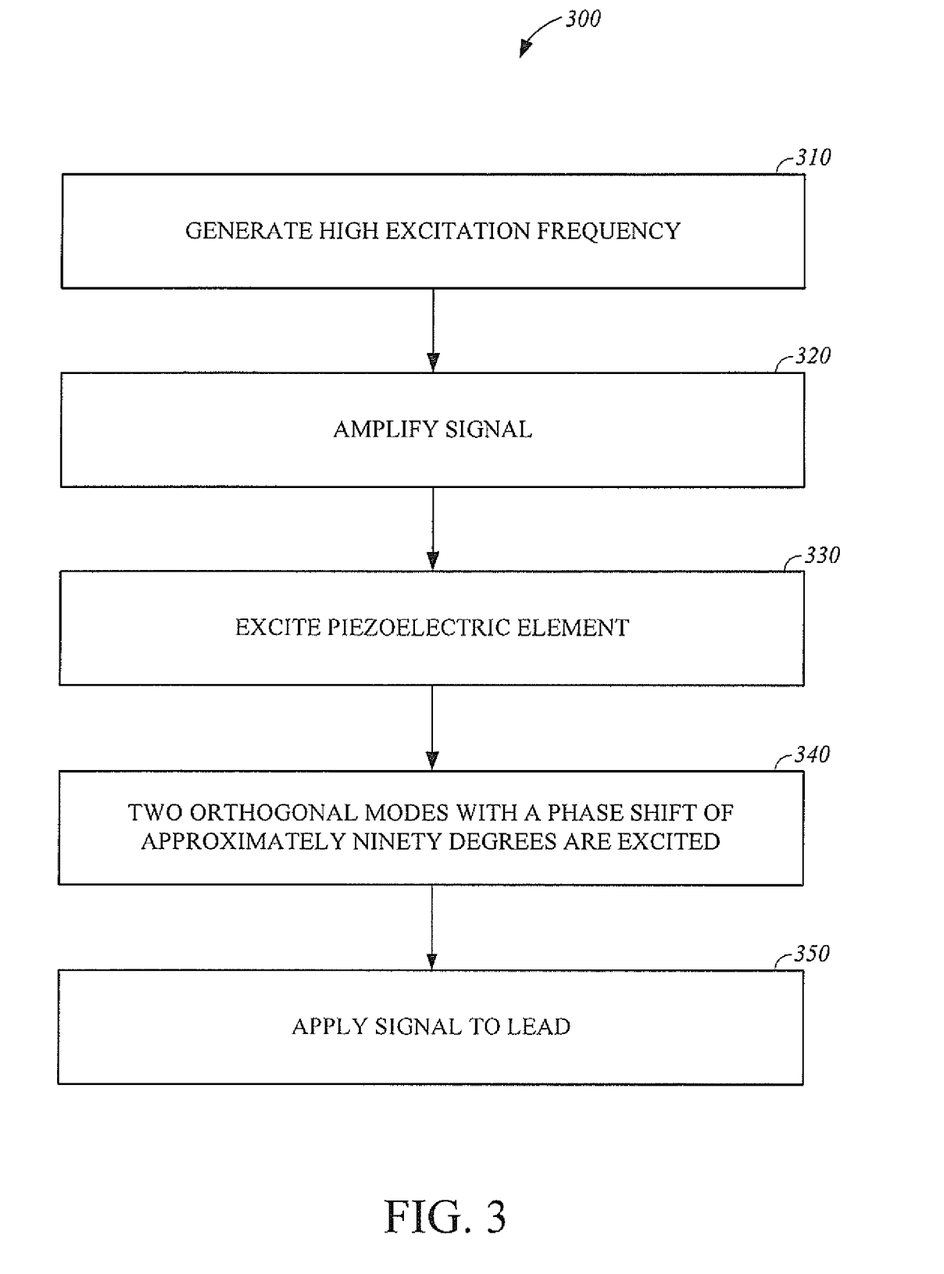
FIG. 3 is a flow diagram illustrating an example of a process for controlling a linear actuator in accordance with some implementations of the present disclosure.

FIG. 3 is a flow diagram illustrating an example of a process 300 for operating a linear actuator in accordance with the present disclosure. The process 300 can include one or more methods of implementing the disclosed technology. The process 300 may be executed by a control system (e.g., control system 16 of FIG. 1A), which may include one or more processors and/or specialized hardware components.

At 310, a signal (e.g., an electrical signal) with a high excitation frequency corresponding to a resonance frequency, v, of a piezoelectric element (e.g., the piezoelectric element 1 illustrated in FIG. 1A) is generated by a generator, which can include the high frequency signal generator 14 shown in FIG. 1A.

At 320, the signal from the generator is amplified (e.g., the power or amplitude of the signal is increased) by an amplifier such as the pulse amplifier 12 shown in FIG. 1A. Amplification of the signal can include amplification up to a predetermined amplitude threshold or amplification to within a predetermined amplitude range.

At 330, the piezoelectric element 1 in a carriage, such as the carriage 18 shown in FIG. 1A, is excited. When excited, two independent orthogonal mechanical vibrational modes of the piezoelectric element interact with each other. In an implementation, a frequency of excitation of the piezoelectric element is in a range of 70 kHz to 80 kHz.

At 340, the phase shift between the two vibrational modes of the piezoelectric element 1 is approximately (e.g., within a predetermined range) 90 degrees, elliptical movement of a contact site (e.g., the contact site 6 illustrated in FIG. 1A) occurs and the process 300 proceeds to 350. In order to achieve this elliptical movement, the excitation resonance frequency $\upsilon$ will be in the range $\upsilon 1 < \upsilon < \upsilon 2$, where $\upsilon 1$ may be a frequency of a natural first order vibrational mode across a width of the piezoelectric element and $\upsilon 2$ may be a frequency of a natural second order vibrational mode across a length of the piezoelectric element.

In an implementation, the piezoelectric element has a natural second order vibrational mode along its length of a frequency $\upsilon 2$ and a natural first order vibrational mode across its width of a frequency $\upsilon 1$. Further, when the frequency $\upsilon 1$ and the frequency $\upsilon 2$ are not equal, the absolute difference between the frequency $\upsilon 1$ and the frequency $\upsilon 2$ is less than or equal to 20%. Furthermore, in some implementations, the frequency $\upsilon 1$ is set such that it is less than the frequency $\upsilon 2$.

At 350, the carriage 18 moves due to the signal from the generator applied to the electrode through the lead. Application of the signal to the piezoelectric element 1 can cause movement of the object. The piezoelectric element can be configured in such a way that due to special geometry and transverse polarization, two mutually orthogonal longitudinal standing waves are excited in the piezoelectric element. The superposition of the mutually orthogonal longitudinal standing waves can create elliptical nano-order movement of the contact site 6. When the contact site is frictionally engaged to the contact plate 7, the moving element 2 moves linearly along the guide 3, and consequently the object (e.g., a blind) that is connected, attached, or coupled to the moving element 2.

Figure 4:
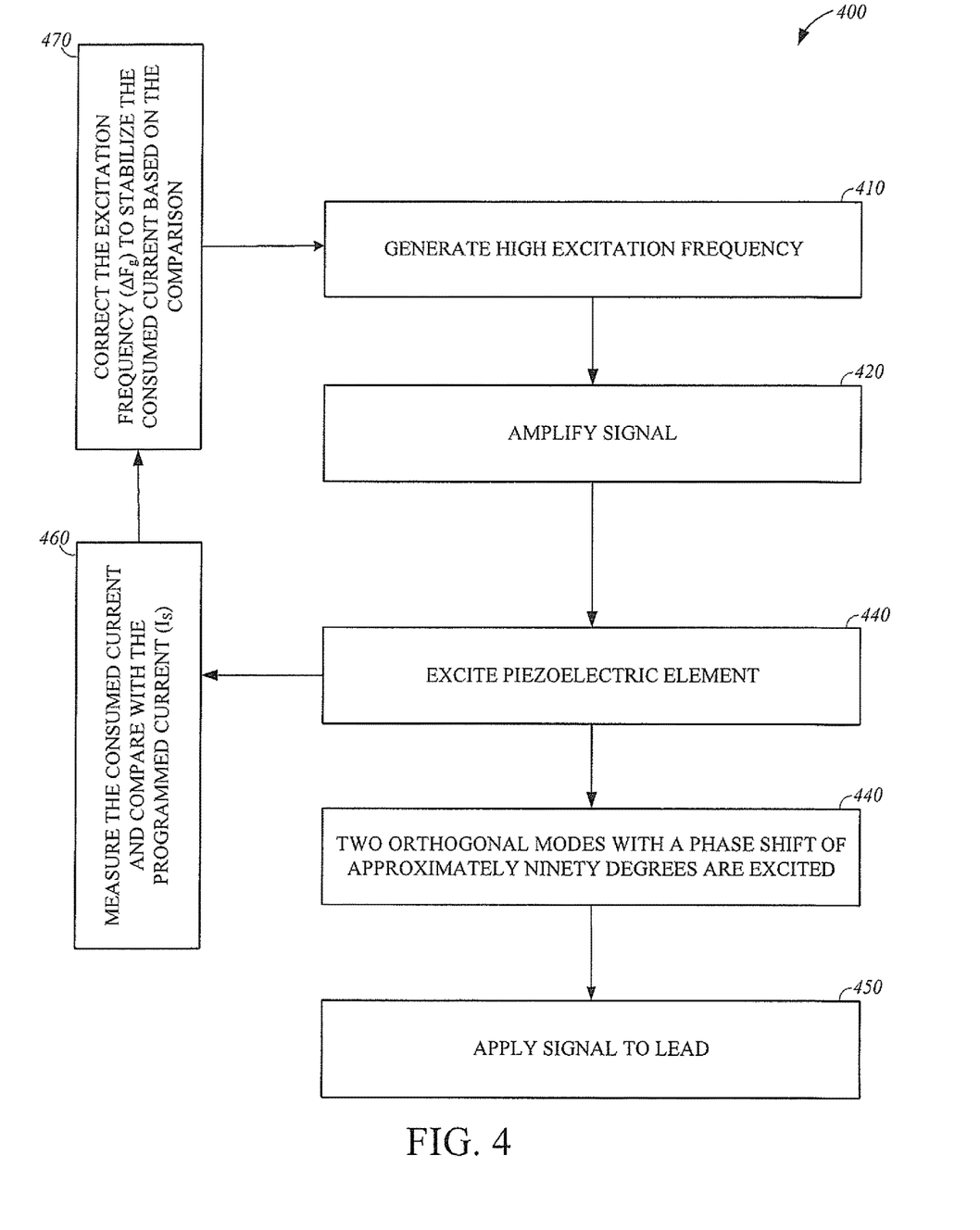
FIG. 4 is a flow diagram illustrating another example of a process for controlling a linear actuator using a current stabilization technique in accordance with some implementations of the present disclosure.

FIG. 4 is a flow diagram illustrating an example of a process 400 for operating a linear actuator in accordance with the present disclosure. The process 400 can include one or more methods of implementing the disclosed technology. The process 400 may be executed by the control system 16, which may include one or more processors and/or specialized hardware components. Operations 410-450 respectively correspond to operations 310-350 of FIG. 3. As such, operations 410-450 incorporate the subject matter discussed with respect to operations 310-350 of FIG. 3. The process 400 of FIG. 4 incorporates a feedback loop that allows the control system to stabilize the consumed current of the linear actuator.

At 410, an electrical signal with a high excitation frequency corresponding to a resonance frequency, $\upsilon$, of the piezoelectric element 1 is generated by a generator, which can include the high frequency signal generator 14 shown in FIG. 1A. At 420, the signal from the generator is amplified (e.g., the power or amplitude of the signal is increased) by an amplifier such as the pulse amplifier 12 shown in FIG. 1A. At 430, the piezoelectric element 1 in the carriage 18, is excited. The control system 16 may excite the piezoelectric element 1 at a set excitation frequency $F_g$. At 440, the phase shift between the two vibrational modes of the piezoelectric element is approximately (e.g., within a predetermined range) 90 degrees, elliptical movement of the contact site 6 occurs and the process 400 proceeds to 450. At 450, the actuator moves due to the signal from the generator.

At 460, when the piezoelectric element 1 is excited in step 440, the current stabilization module 17 measures a consumed current and compares the consumed current with a programmed current ($I_S$). In these implementations, the current stabilization module 17 may be configured to measure the consumed current that is flowing through the linear actuator by way of the leads, electrodes, the common electrode, and piezoelectric element. The current stabilization module compares the measured consumed current with the programmed current. As discussed with respect to FIG. 1B, the programmed current is a preset value that represents the desired current to be consumed by the linear actuator.

At 470, the current stabilization module corrects the excitation frequency, $F_g$, based on the results of the comparison and a working resonance curve (e.g., working resonance curve 150 of FIG. 1B) that corresponds to the linear actuator. As mentioned, the control system will be exciting the piezoelectric element 1 at operation 440 at a set excitation frequency via the electric signal. Knowing the measured current, the set excitation frequency, and a working resonance curve, the current stabilization module can determine a corrected excitation frequency ($\Delta F_g$). Referring back to FIGS. 1A and 1B, the current stabilization module can select a resonance curve from a plurality of resonance curves (e.g., resonance curves 122-1, 122-2, 122-3 of FIG. 1B) and determine a point of intersection between the selected resonance curve and the programmed current. The current stabilization module may then determine the corrected excitation frequency corresponding to the intersection point (e.g., the value on the x-axis of the intersection point). The current stabilization module may set the excitation frequency to the determined frequency value, and may output the newly determined excitation frequency to frequency signal generator, which adjusts the excitation frequency accordingly.

The process 400 of FIG. 4 may continue to loop in the manner described above for the duration while the linear actuator is in operation.

Figure 5:
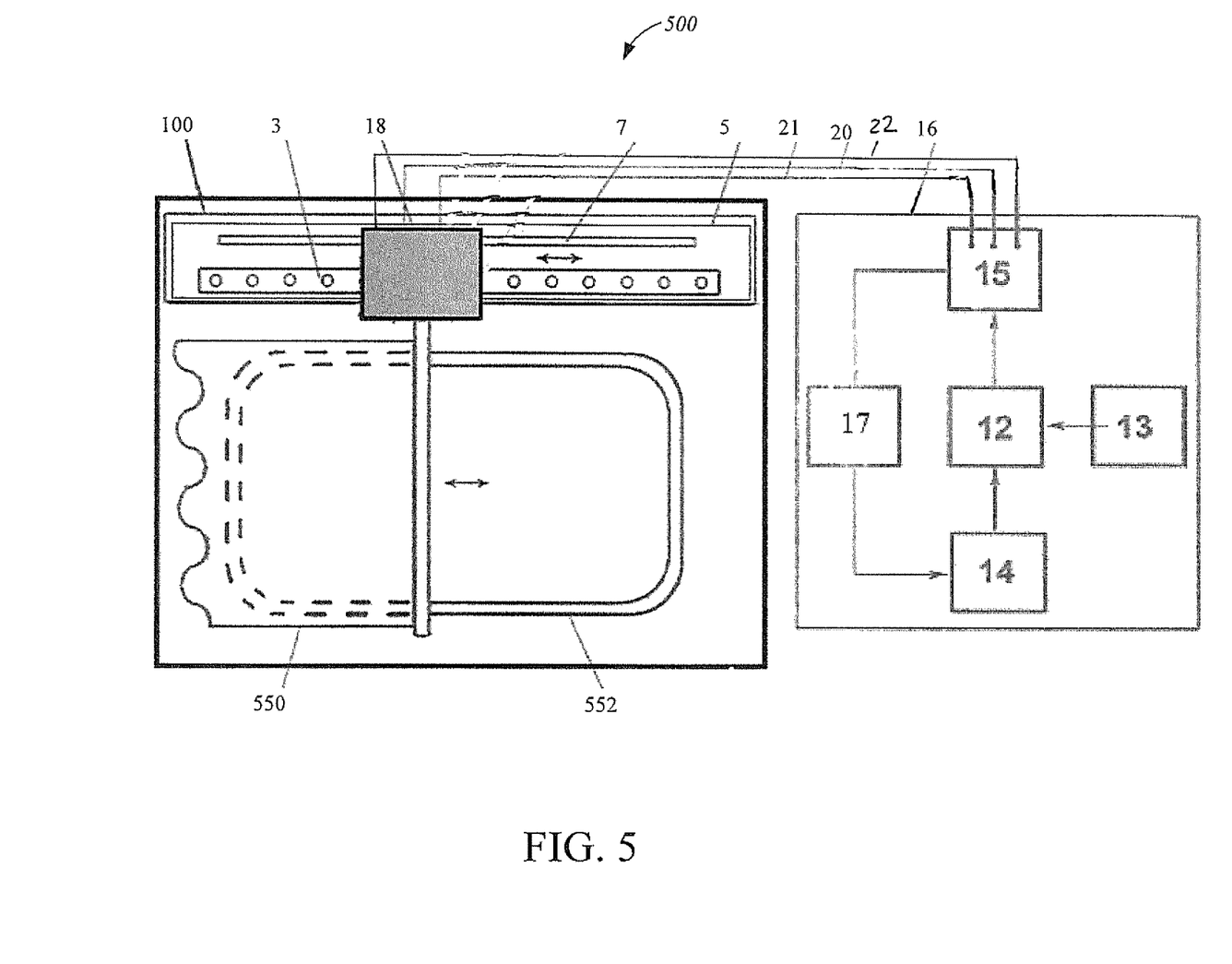
FIG. 5 is a diagram illustrating an example of a motorized blind system in accordance with the present disclosure.

FIG. 5 is a diagram illustrating an example of the linear actuator 100 disclosed here used with a blind. As used in this disclosure, the term "blind" can refer to one or more "blinds" and can include any type of object (e.g., a blind or shade) that is used to cover some or all portions of another object (e.g., a window).

The motorized blind system 500 includes the linear actuator 100 disclosed herein, and further includes a window 550 with a blind 552.

The linear actuator 100 can be positioned or orientated along the direction of movement of the blind 552 (e.g., a window blind), which can be used to cover and uncover the window 550 (e.g., an airplane window). In an implementation, the actuator 100 can be mounted, coupled, or attached, to the blind 552 via the carriage 18.

When the signal (e.g., the high frequency signal) is applied to a lead 20 or 21 that is connected one of electrode 10 on the piezoelectric element 1, the movement of the piezoelectric element 1 occurs, which in turn moves the contact point 6, which in turn moves carriage 18 along the guide 3 in a first direction. When the signal (e.g., the high frequency signal) is applied to other lead 20 or 21 that is connected the other of electrode 10 on the piezoelectric element 1, the movement of the piezoelectric element 1 is reversed, which in turn moves the contact point 6, which in turn moves carriage 18 along the guide 3 in a second direction, causing the blind to move in the opposite direction (e.g., closing when the blind 552 is in the open position or opening when the blind is in the closed position). The linear actuator 100 is configured to move the blind fully between an open position and a closed position and hold the blind at the open position, the closed position, any position in-between the open position and the closed position.

The motorized blind system 500 of FIG. 5 is provided for example only. The motorized blind system 500 can be implemented in other suitable manners without departing from the scope of the disclosure.

In some implementations, the maximum speed or force produced by the actuator can be varied by changing the shape of the contact site to, for example, a triangular, trapezoidal, or rectangular shape.

In some embodiments, robotic positioning systems, such as 3D printers, can be moved by one or more linear actuators disclosed herein. For example, a 3D printer system can comprise two or three independently moving linear actuators positioned in mutually orthogonal XY or XYZ configurations, the linear actuator apparatus configured to move a tool along these X, Y or Z axes thus providing simultaneously precise and fast movement along these axes.

Preliminary experiments with the linear actuator 100 illustrated in FIG. 1A, in which dimensions of a piezoelectric element 1 (e.g., plane resonator, or piezoelectric resonator) include sides measuring, as an example, 50 mm by 22 mm by 4 mm, indicate a frequency of excitation $\upsilon$ equal to 75 kHz, a force of more than 10 N, and a speed of 0.2 m/s, on a linear guide of 26 inches, with consumed power in the order of 10 W.

An advantage of the disclosed technology is its low operational noise and simple design. Further, the total weight of an actuator in the disclosed technology can be 270 g or less, which is approximately half the weight of other actuators that include a reducer.

In some implementations, the holding force of a linear actuator in the disclosed technology (which requires no power consumption) is more than 50 N. This holding force allows the disclosed technology to be used in a variety of different positions including a vertical position, and in situations with external mechanical interference such as airplane vibrations. The resolution (minimum increment of movement) of the system can be approximately (e.g., within a predetermined range distance) 10 microns and can be improved down to 1 micron, using stepping (pulse) control.

The advantages of the disclosed technology when compared to a traditional electromagnetic motorized blind the proposed system advantages include a lower weight, which can include a weight savings of approximately 50%; a vast travel range, which is constrained by the length of rail used; a fixed position with zero power consumption, since when the piezoelectric motor is not energized, no power is consumed, the position of the blind is held fixed (self-braked) by the self-decelerating force of the motor and the same force "locks" the drive system of the motor, thereby reducing or eliminating the need for a break; direct drive, since the disclosed technology eliminates the need for a gear-train; smooth silent motion, the piezoelectric motor provides high resolution and silent operation; reduction in the cost to produce the motorized blind.

While the disclosed technology has been described in connection with certain embodiments, it is to be understood that the disclosed technology is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A linear actuator apparatus, comprising:
   a base;
   a linear guide coupled to a flat, planar side of the base and extending in a travel length of an object to be moved;
   a contact plate extending along the flat, planar side of the base;
   a carriage comprising:
      an enclosure formed of an acoustically isolating material;
      a moving element configured and dimensioned to mechanically couple with the linear guide and to move along the guide, the moving element coupled to the enclosure;
      a piezoelectric element, the piezoelectric element including a contact site in physical contact with the contact plate; and
      a housing elastically holding the piezoelectric element, wherein the housing is coupled to the enclosure and has no direct contact with the moving element; and
   an electrical power source that is in electrical communication with the piezoelectric element, wherein the electrical power source energizes the piezoelectric element to effectuate movement of the carriage along the linear guide via the physical contact between the contact site and the contact plate.

2. The linear actuator apparatus according to claim 1, wherein the contact site on the piezoelectric element is trapezoidal, triangular, elliptical, or rectangular.

3. The linear actuator apparatus according to claim 1, wherein the physical contact between the contact site and the contact plate is maintained without drawing a current by springs positioned between the holder and the enclosure.

4. The linear actuator apparatus according to claim 1, wherein a frequency of excitation of the piezoelectric element is in a range of 70 kHz to 80 kHz.

5. The linear actuator apparatus according to claim 4, operating on a right side of a resonance curve.

6. The linear actuator apparatus according to claim 1, further comprising:
   a control system to control the electrical power source, the control system comprising a pulse amplifier, an external power supply, and a high frequency signal generator.

7. The linear actuator apparatus according to claim 6, further comprising:
   a plurality of conducting rails mounted to the base along the linear guide and that electrically communicate with the power supply; and
   at least one brush that is in contact with the plurality of conducting rails, wherein the at least one brush electrically connects the plurality of conducing rails with the piezoelectric element, wherein the at least one brush is in continuous contact with at least one of the plurality of conducting rails during movement of the actuator.

8. The linear actuator apparatus according to claim 7, further comprising a plurality of lead lines that respectively electrically connect the power supply to the plurality of conducting rails.

9. The linear actuator apparatus according to claim 1, wherein the piezoelectric element can generate a second order vibrational mode along a length of the piezoelectric element and a first order vibrational mode across a width of the piezoelectric element.

10. The linear actuator apparatus according to claim 1, wherein the piezoelectric element has a natural second order vibrational mode along a length of a frequency $\upsilon 2$ and a natural first order vibrational mode across a width of a frequency $\upsilon 1$, wherein when the frequency $\upsilon 1$ and the frequency $\upsilon 2$ are not equal, an absolute difference between the frequency $\upsilon 1$ and the frequency $\upsilon 2$ is less than or equal to 20%.

11. The linear actuator apparatus according to claim 10, wherein the frequency $\upsilon 1$ is less than the frequency $\upsilon 2$.

12. The linear actuator apparatus according to claim 1, wherein the piezoelectric element includes two electrodes on one side of the piezoelectric element and a common electrode on another side of the piezoelectric element, wherein the piezoelectric element is polarized perpendicular to flat resonator surfaces of the piezoelectric element.

13. The linear actuator apparatus according to claim 12, wherein the two electrodes include a first electrode and a second electrode, wherein the first electrode receives a first current to effectuate movement in a first direction along the linear guide, and the second electrode receives a second current to effectuate movement in a second direction along the linear guide that is opposite to the first direction.

14. The linear actuator apparatus according to claim 1, wherein the moving element includes a linear slider with bearings.

15. The linear actuator apparatus according to claim 1, wherein the piezoelectric element is in the shape of a rectangular plane resonator of standing longitudinal waves and the contact site is located in a middle portion of a side of the piezoelectric element.

16. The linear actuator apparatus according to claim 1, wherein the piezoelectric element is in solderless electrical contact with an electrically conductive material that is embedded within the holder and in electrical contact with the electrical power source.

17. The linear actuator apparatus according to claim 1, further comprising a control system that outputs an electric signal that oscillates at an excitation frequency, the control system comprising:
the electrical power source;
a frequency signal generator that oscillates the electric signal at the excitation frequency; and
a current stabilization module, wherein the current stabilization module is configured to:
measure a consumed current flowing through the linear actuator apparatus;
compare the consumed current with a preprogrammed current;
adjust the excitation frequency until the consumed current becomes equal to the preprogrammed current.

18. The linear actuator apparatus according to claim 1, wherein a flat surface of the linear guide is in complete contact with the flat, planar surface of the base.

19. A motorized blind system comprising the linear actuator apparatus of claim 1, wherein the carriage is attached to a blind, the linear actuator apparatus configured to move the blind fully between an open position and a closed position and hold the blind at the open position, the closed position, any position in-between the open position and the closed position.

20. A robotic positioning system comprising the linear actuator apparatus of claim 1, wherein two or three independently moving linear actuators are positioned in mutually orthogonal XY or XYZ configurations, the linear actuator apparatus configured to move a tool along X, Y or Z axes to provide simultaneously precise and fast movement along the X, Y and Z axes.

* * * * *